United States Patent [19]

van der Lely et al.

[11] 3,810,434
[45] May 14, 1974

[54] AGRICULTURAL CULTIVATOR AND SEED FRILL COMBINATIONS

[76] Inventors: Ary van der Lely, 10, Weverskade, Maasland; Cornelis Johannes Gerardus Bom, 36, Esdoornlaan, Rozenburg, both of Netherlands

[22] Filed: Apr. 14, 1972

[21] Appl. No.: 244,048

[30] Foreign Application Priority Data
Apr. 21, 1971  Netherlands...................... 7105355

[52] U.S. Cl....................... 111/10, 172/59, 172/58, 172/552
[51] Int. Cl................................ A01c 7/08
[58] Field of Search............... 111/80, 10, 52, 63, 8, 111/9, 85, 68; 172/110-113, 59, 450, 47, 63, 439, 552; 222/178

[56] References Cited
UNITED STATES PATENTS

| | | | |
|---|---|---|---|
| 2,730,054 | 1/1956 | McDonald | 111/10 |
| 2,743,656 | 5/1956 | Fraga | 172/450 X |
| 3,322,429 | 5/1967 | Cervelli | 222/178 X |

FOREIGN PATENTS OR APPLICATIONS

| | | | |
|---|---|---|---|
| 6,908,785 | 12/1970 | Netherlands | 172/59 |
| 2,002,653 | 10/1969 | France | 172/110 |
| 1,009,414 | 5/1957 | Germany | 172/439 |

Primary Examiner—Stephen C. Pellegrino
Attorney, Agent, or Firm—Mason, Mason & Albright

[57] ABSTRACT

Combinations of agricultural implements are mounted to the front and rear of a tractor. The front of the tractor pushes a fertiliser preferably having its own source of power, to operate the delivery device. At the rear of the tractor is a cultivator with a plurality of soil working members that are rotatably connected to the power take off of the tractor. The cultivator is connected to a lifting hitch and a seed dispenser is pivotably connected to the rear of the cultivator and also connected to the upper point of the lifting device. Flexible chains interconnect the seed dispenser with the upper lifting point so that the dispenser can be raised with the cultivator by the lifting device. The dispenser is mounted on ground wheels which can power the operation thereof. At the rear of the cultivator a soil engaging roller is mounted which regulates the working depth of the cultivator and smooths the soil.

1 Claim, 2 Drawing Figures

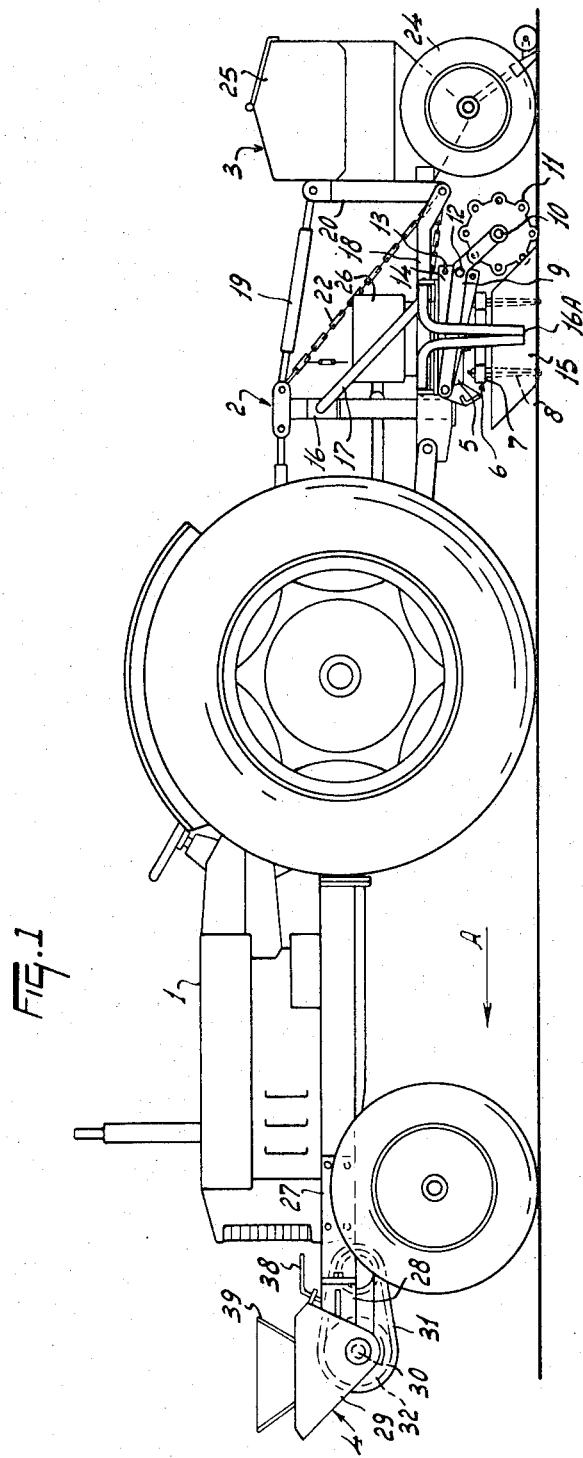

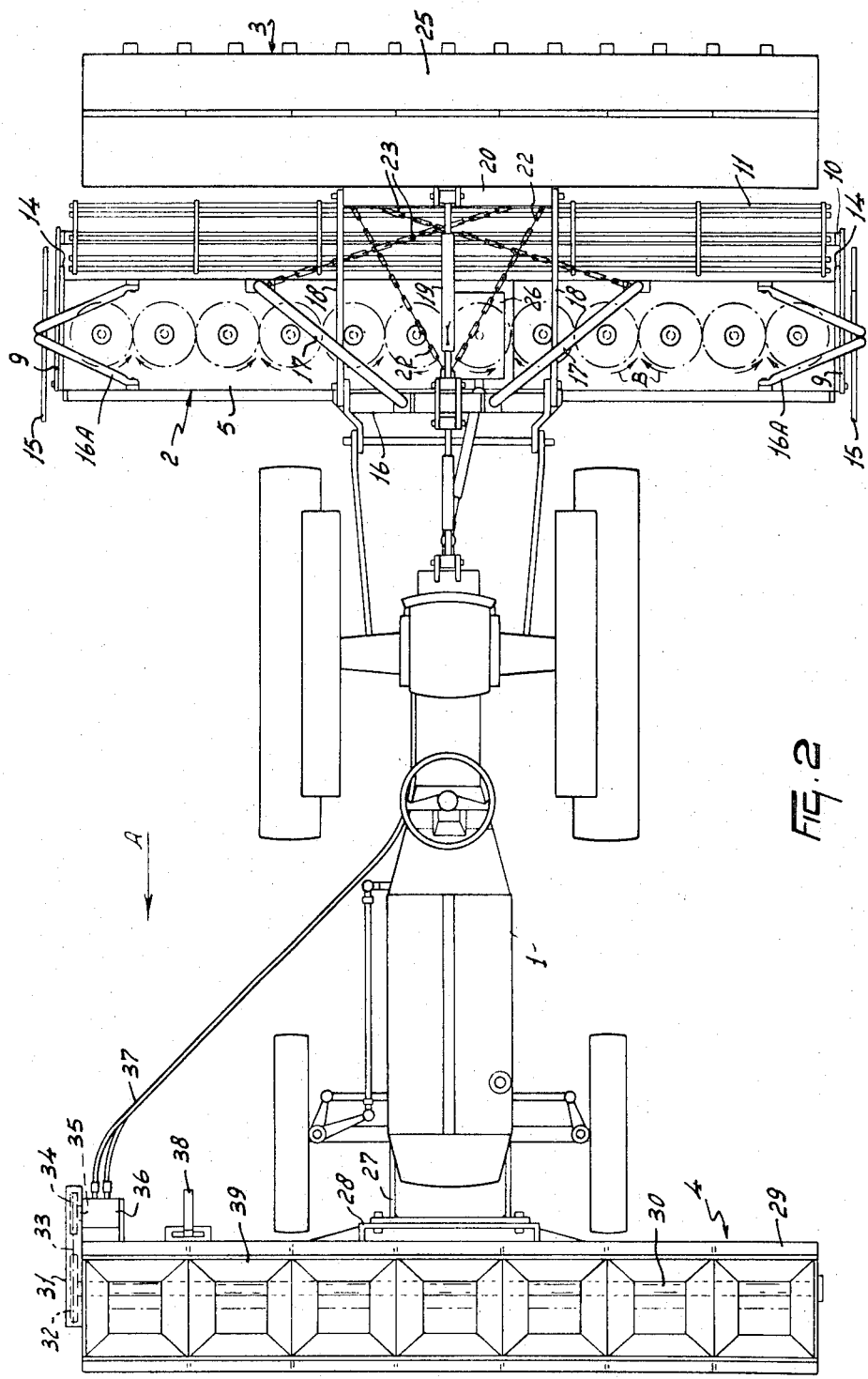

AGRICULTURAL CULTIVATOR AND SEED FRILL COMBINATIONS

This invention relates to combinations of tractors with cultivators and seed drills, such combinations being of the kind in which the cultivator is connected to a lifting device or hitch at the rear of the tractor and comprises a row of soil working members that are rotatable about corresponding upright axes, and in which the seed drill is arranged to co-operate with the cultivator.

When using combinations of the kind set forth above, it is often desirable that the ground should be fertilised at about the same time. If the fertiliser is separately spread, prior to using the combination, by a fertiliser distributor mounted on the tractor of the combination, or on a different tractor, many additional traverses of the field are needed which raises costs and causes undesirable soil compaction. If the fertiliser distributor is also connected to the combination at the rear thereof, the application of weight to the lifting device or hitch at the back of the tractor becomes too great and the steering is adversely affected.

According to the invention, there is provided a combination of the kind set forth, wherein an implement for the supply of fertiliser to the soil is arranged at the front of the combination with respect to the intended direction of forward travel thereof.

For a better understanding of the invention, and to show how the same may be carried into effect, reference will now be made, by way of example, to the accompanying drawings, in which:

FIG. 1 is a side elevation of a combination in accordance with the invention, and FIG. 2 is a plan view corresponding to FIG. 1.

Referring to the drawings, the agricultural combination which is illustrated comprises a tractor 1, a soil cultivating implement or cultivator 2, a seed drill 3 arranged to cooperate with the cultivator and an implement 4 for the supply of fertiliser to the soil. The cultivator 2 has a hollow main frame beam 5 that extends substantially horizontally perpendicular to the intended direction of operative travel of the combination which is indicated by an arrow A in both Figures of the drawings. The main frame beam 5 supports a transverse row of soil working members 6 that are disposed in side-by-side relationship in such a way as to rotate about corresponding upright axes which will normally be substantially vertically disposed. The shafts which afford the axes of rotation that have just been mentioned are journalled in bearings carried by the main frame beam 5 and each such shaft is provided, at its lower end, with a corresponding substantially horizontally disposed tine support 7 the opposite ends of which exhibit tine holders in which the upper fastening portions of rigid tines 8 are secured. At least the lower soil working portion of each tine 8 tapers downwardly towards its lowermost free end or tip and each tine has a square or other angular cross-section. Moreover, at least the soil working portions of the tines are formed with longitudinally extending recesses or cavities in the otherwise flat surfaces thereof that lie between the angular corners of their cross-sections. The lower soil working portions of the tines 8 make angular junctions of a little less than 180° with the upper fastening portions thereof and said fastening portions are normally connected to the tine supports 7 in such a way that the lower soil working portions trail, rather than lead, with respect to the intended direction of rotation B of each soil working member 6.

The distance between the lowermost free ends or tips of the two tines 8 of each soil working member 6 is substantially the same as the distance between the points at which the upper fastening portions of the same two tines are secured to their holders. This distance is slightly more than the perpendicular distance between the axes of rotation of two neighbouring soil working members 6 so that, in the use of the combination, the cultivator 2 works a plurality of overlapping strips of land and thus effectively produces a single broad strip of worked soil. It is preferred that the perpendicular distance between the axes of rotation of two neighbouring soil working members 6 should be 25 centimeters and, in the embodiment which is being described, there are twelve soil working members 6 so that the cultivator has an overall working width of substantially 300 centimeters.

Arms 9 are pivotally connected to the opposite lateral ends of the main frame beam 5 so as to be turnable about substantially horizontally aligned pivots which define an axis that is located close to the front of the beam 5 with respect to the direction A, said axis extending substantially perpendicular to that direction. The arms 9 extend generally rearwardly from their pivots with respect to the direction A and rearmost end portions thereof are inclined downwardly. A soil compressing member in the form of a roller 11 is rotatably mounted between the extreme rear ends of the arms 9 with the aid of stub shafts 10 that define a substantially horizontal axis extending substantially perpendicular to the direction A. The soil-engaging periphery of the roller 11 is afforded principally, in this embodiment, by a plurality, such as eight, of elongated and relatively spaced apart tubular or other rod-shaped elements each of which extends substantially parallel to the axis of rotation defined by the stub shafts 10 and to the longest dimension of the main frame beam 5. As an alternative, the elongated soil-engaging elements of the roller 11 may be wound helically around the axis of rotation defined by the stub shafts 10 but this arrangement is not shown in the accompanying drawings. The elongated elements are movable turnably with respect to the plates of the roller 11 by which they are supported and each of them is mounted in its position in a readily releasable manner. Each arm 9 carries a corresponding pin or bolt 12 that can be entered in any chosen one of an arcuately curved row of holes 13 formed near the rearmost edge of a corresponding substantially vertical sector plate 14 secured to the respective lateral end of the main frame beam 5. The centers of curvature of the two rows of holes 13 coincide with the axis about which the two arms 9 are upwardly and downwardly turnable and it will be evident from FIG. 1 of the drawings that the particular holes 13 which are chosen for co-operation with the pins or bolts 12 determine the angular settings of the arms 9 about their pivotal mountings and thus the horizontal level of the axis of rotation of the roller 11 relative to the horizontal level of the remainder of the cultivator 2. It will be realised that the chosen angular setting of the arms 9 is an important factor in determining the depth of penetration of the tines 8 into the soil during the use of the combination.

Substantially vertically disposed shield plates 15 are located just beyond the opposite ends of the row of soil working members 6 and each shield plate 15 is connected by a pair of arms 16A to a corresponding pair of pivots disposed on top of the beam 5 so as to define an axis that extends substantially horizontally parallel to the direction A. The shield plates 15 are shaped and arranged in such a way that their lowermost edges will slide over the ground surface during the use of the combination, said shield plates 15 being turnable upwardly and downwardly relative to the main frame beam 5 about the axes that have just been mentioned so as to enable them to follow undulations in the surface of the ground over which the combination is travelling. When the combination is to be moved from one place to another without performing any working operation, the two shield plates 15 can be turned upwardly through approximately 180° about their pivotal connections with the main frame beam 5 to bring them to inverted inoperative positions in which they bear downwardly upon the upper surface of said beam through the intermediary of the arms 16A.

A trestle-shaped coupling member 16 is secured to the front of the main frame beam 5 approximately centrally of that beam and is employed in the manner which can be seen in outline in the drawings in connecting the cultivator 2 to the rear three-point lifting device or hitch of the tractor 1. Downwardly inclined and rearwardly divergent tie bars 17 connect upper regions of the coupling member 16 to upper rear regions of the main frame beam 5 and the foot of the coupling member 16 is provided with two rearwardly projecting coupling arms 18. The rearmost ends of the two coupling arms 18 are pivotally connected to the foot of a further trestle-shaped coupling member 20 and an arm 19 of adjustable length has its opposite ends pivotally connected to the apices of the two coupling members 16 and 20. The second coupling member 20 is rigidly secured to the frame or body of the seed drill 3 which drill may be of a known construction. It will be appreciated that the seed drill 3 is connected to the leading coupling member 16 by a parallelogram linkage so that the drill 3 can move upwardly and downwardly relative to the coupling member 16 and cultivator 2 without any appreciable tilting. However, in order to ensure that the seed drill 3 can be lifted by the rear three-point lifting device or hitch of the tractor 1 with the cultivator 2, two flexible but inextensible members in the form of chains 22 extend between the apex of the leading coupling member 16 and the foot of the second coupling member 20. Two further chains 23 extend between the rearmost ends of the tie bars 17 and the foot of the second coupling member 20 for the same purpose and it will be seen from FIG. 2 of the drawings that the two chains 23 cross one another in plan view. The chains 22 and 23 afford limiting members arranged to prevent the seed drill 3 from moving downwardly beyond a predetermined but adjustable position with respect to the cultivator 2 and its coupling member 16. The adjustment which has just been mentioned can, of course, be made by altering the effective lengths of the chains 22 and 23.

The seed drill 3 has a frame or body that is provided with ground wheels 24, said frame or body carrying a seed hopper 25 that extends substantially parallel to the maximum dimension of the main frame beam 5 of the cultivator 2. A feeding member (not visible in the drawings) extends through the hopper 25 in a direction substantially horizontally perpendicular to the direction A and is arranged to feed seeds from that hopper to the upper ends of seed tubes which lead downwardly to the coulters whose general arrangement can be seen in outline in the drawings. It will be seen from FIG. 2 of the drawings that the effective working width of the seed drill 3 is substantially the same as that of the foregoing cultivator 2.

One of the central pair of soil working members 6 of the cultivator 2 has the shaft which affords its axis of rotation extended upwardly into a gear box 26 and a forwardly projecting rotary input shaft of said gear box 26 is placed in driven connection with the power take-off shaft of the tractor 1 by way of an intermediate telescopic transmission shaft of known construction having universal joints at its opposite ends. The drive transmission to the soil working members 6 of the cultivator 2 preferably also includes an adjustable drive means with the aid of which different speeds of rotation of the soil working members 6 can be produced in response to a single speed of rotation of the power take-off shaft of the tractor 1. This adjustable drive means is not, however, shown in the accompanying drawings. The feeding member and other moving parts of the seed sowing mechanism of the seed drill 3 are operated, in known manner, by drive derived from the rotation of the ground wheels 24.

The front of the tractor 1 with respect to the direction A is provided with a forwardly projecting support 27 to which is bolted or otherwise rigidly secured a support 28 that carries the hopper 29 of the fertiliser supplying implement 4. The hopper 29 extends substantially horizontally perpendicular to the direction A and has a length in that direction which is greater than the width of the tractor 1 and substantially equal to the working width of both the cultivator 2 and the seed drill 3. A delivery shaft 30 extends through a lower region of the hopper 29 and operates a delivery member 30A on this shaft that is arranged to eject fertiliser, which will usually be artificial powdered or granular fertiliser, through holes (not visible) in the bottom of the hopper. One end of the delivery shaft 30 projects beyond the corresponding end wall of the hopper 29 and carries a sprocket wheel 32 that is located within a protective chain casing 31. A hydraulic motor 36 is mounted immediately to the rear of the end of the hopper from which the shaft 30 projects and its rotary output shaft 35 carries a sprocket wheel 34 (of smaller diameter than the sprocket wheel 32) which is placed in driving connection with said sprocket wheel 32 by way of an endless transmission chain 33. The hydraulic motor 36 is operated by the hydraulic system of the tractor 1 by way of a pair of flexible ducts 37 that interconnect said system and the motor 36. The sizes of the aforementioned holes in the bottom of the hopper 29 through which the fertiliser is ejected onto the ground can be increased and decreased, in known manner, by means of a lever 38 in order to control the quantity of fertiliser per unit time of operation of the combination or per unit area of ground traversed by the combination. The hopper 29 is shown fitted with an upward extension 39 by which its effective capacity is considerably increased.

In the use of the combination which has been described, it travels over the ground in the direction A with the power take-off shaft of the tractor 1 rotating the soil working members 6 of the cultivator 2 in the directions B shown in FIG. 2 of the drawings by way of the transmission that has been described. The strip of land worked by the cultivator 2 is levelled by the roller 11 whose construction is such that it tends to break up or crumble any lumps of soil left on the ground surface by the tines 8. Seed can immediately be sown into the worked soil by the drill 21 which lies just behind the roller 11 with respect to the direction A. When required, fertiliser can be delivered to the ground by the implement 4 in advance of the cultivator 2 so that said fertiliser can be thoroughly mixed with the soil by the cultivating action of the tines 8. The use of the hydraulic motor 36 to drive the delivery shaft 30 of the fertiliser supplying implement has the advantage that the fertiliser can be delivered very accurately so that it reaches the strip of ground over which the combination is travelling in correct and uniform quantities.

In the combination which has been described, the tractor 1 receives an advantageous load distribution of the weight of the cultivator 2, seed drill 3 and fertiliser supplying implement 4 while remaining accurately steerable in the normal manner, the latter being important for seed sowing purposes. The fertiliser reaches the soil at a distance in front of the soil working members 6 of the cultivator 2 which is such that there is little danger of said fertiliser being displaced to any great extent by those members. Delivery of the fertiliser to the region of the ground which is simultaneously being cultivated by power-driven soil working members sometimes tends to produce an irregular fertilising pattern which can result in underfertilised plants in some areas and scorched seed in others. As previously mentioned, the provision of the chains 22 and 23 enables the seed drill 3 to be lifted clear of the ground with the cultivator 2 by the three-point lifting device or hitch of the tractor 1 for inoperative transport purposes but it will be realised that the arrangement could be such that the drill 3 remains in contact with the soil by way of its ground wheels 24, only the coulters of the drill being retracted upwardly for transport purposes. The chains 22 and 23 prevent the drill 3 swinging from side-to-side during inoperative transport.

Although certain features of the combination which has been described and/or illustrated in the accompanying drawings will be set forth in the following claims as inventive features, it is emphasised that the invention is not necessarily limited to those features and that is includes within its scope all of the parts of the combination that have been described and/or illustrated both individually and in various conjoinments. The term "tractor" is to be interpreted throughout this Specification as including any vehicle that is capable of functioning as part of the combination which has been described and is not limited solely to a conventional agricultural tractor.

What we claim is:

1. An agricultural implement combination comprising a tractor having a fertilizer attachment device connected to the front of said tractor, a cultivator with trailing seed drill coupled to a lifting hitch at the rear of said tractor, said fertilizer device having an elongated hopper which extends transverse to the intended direction of travel of the combination and said hopper housing a rotary delivery member on an operating shaft for the ejection of fertilizer from said hopper in front of the tractor, said delivery member being operated to dispense fertilizer at a spaced distance in front of said cultivator, said cultivator having a plurality of counter rotating soil-working members arranged in a transverse row and rotatable about upwardly extending shafts, said shafts being in driven engagement with a power take off of the tractor, said fertilizer being dispensed in front of soil displaced by said soil-working members and being evenly distributed with the soil at the rear thereof, coupling members interconnected to the front and the rear of said cultivator, the apices of said coupling members being connected by an arm of adjustable length, said seed drill being pivotally connected to a coupling member at the rear of the cultivator, a soil smoothing roller extending across the width of the combination, said roller having a plurality of elongated elements extending substantially parallel to the axis of rotation of said roller and said roller being pivotally connected to said cultivator behind the said row of soil-working members and in front of said drill, the working width of said elongated hopper being substantially equal to the working width of said cultivator.

* * * * *